Figure 1:
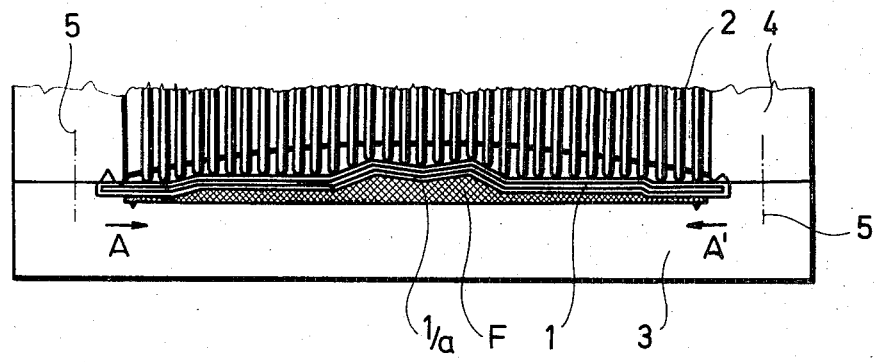

United States Patent
Bartha et al.

[11] 3,850,568
[45] Nov. 26, 1974

[54] EXTRUSION DIE WITH ADJUSTABLE PROFILE

[75] Inventors: Zoltan Bartha; Vince Fodor; Gyula Subotics, all of Budapest, Hungary

[73] Assignee: Orszagos Gumiipari Vallalat, Budapest, Hungary

[22] Filed: Feb. 8, 1973

[21] Appl. No.: 330,645

[30] Foreign Application Priority Data
Feb. 11, 1972 Hungary .............................. OA 494

[52] U.S. Cl. ................................. 425/466, 425/381
[51] Int. Cl. ............................................. B29f 3/04
[58] Field of Search ............ 425/140, 141, 466, 381

[56] References Cited
UNITED STATES PATENTS

| | | | |
|---|---|---|---|
| 1,252,821 | 1/1918 | Lewis | 425/466 |
| 2,346,393 | 4/1944 | Render | 425/381 X |
| 2,720,679 | 10/1955 | Ratliff | 425/466 X |
| 3,003,245 | 10/1961 | Nunez, Jr. | 425/376 X |
| 3,195,183 | 7/1965 | Phillips | 425/466 |

FOREIGN PATENTS OR APPLICATIONS
86,980   1/1922   Austria .............................. 425/380

*Primary Examiner*—R. Spencer Annear
*Attorney, Agent, or Firm*—Young & Thompson

[57] ABSTRACT

An extrusion die has an extrusion orifice defined on at least one side by a resilient steel strip that extends transverse to the direction of extrusion. The strip is secured to the die at its upstream edge and is free along its downstream edge. A plurality of elements are adjustable in a direction perpendicular to the direction of said extrusion and perpendicular to the length of the strip and bear against the downstream edge of the strip on the side opposite the side along which the material is extruded, so as variably to shape the resilient strip thereby to determine the contour of the extrusion orifice. The means for adjusting the elements can be screw means or hydraulic means.

5 Claims, 6 Drawing Figures

EXTRUSION DIE WITH ADJUSTABLE PROFILE

The invention relates to an adjustable extrusion die especially for the extrusion of plastic and plastoelastic materials.

According to known techniques if the cross section of the extruded body is to be changed, the profile piece containing the extrusion opening is to be changed, this operation, however, is time consuming and related with the rise of waste material.

It is a further problem that the extruded product after leaving the profile piece changes its dimensions and the changes depend on the composition of the plastic or plastoelastic material or mixture because the said product swells. Swelling is especially important while using plasto-elastic materials and mixtures. This subsequent swelling must be taken into account while designing the profile pieces in order to achieve that the final dimensions of the extruded product should correspond to the required cross section.

At profile pieces generally used there is no possibility to accurately alter the shape and the dimensions of the discharge opening during production according to quality changes of the extruded mixture, in order to form this opening according to continuous curves.

As a further drawback of the known apparatus it may be mentioned that the quality of the end product is significantly influenced in several cases through the variation of the cross section of the extruded plastoelastic products especially in case of products having strict dimensional requirements.

Adjustable extrusion dies have become known already in which the shape of the extrusion opening is altered by means of juxtaposed plates movable in a direction perpendicular to the direction of extrusion. However by such apparatus only cross sections limited by stepped lines can be produced but a cross section limited by continuous curves cannot be made.

It is an object of the present invention to provide an extension head having a discharge opening with a continuously variable shape for producing endless extruded products having determined cross-sections using plastic or plasto-elastic materials and eliminating thereby the drawbacks present in prior art structures.

The invention starts from the idea that the stiff walls applied up to now for limiting the extrusion cavity and the extrusion opening are to be replaced by flexible, deformable walls surrounding the said cavity and discharge opening.

According to the invention the lower and or upper part that is to say at least one wall of the discharge opening and of the cavity positioned in front of the said opening of the extrusion head is formed by a steel plate or by steel plates shaped by the pressure developed in the head, the said plate/s/ being limited by supports the position of which can be continuously varied.

The said elastically deformable steel plate or bundle of them serving for shaping the discharge opening must be fixed. This may be done advantageously through inserting a short profile piece between a slot formed in the lower part of the extrusion head and the lowermost plate. In another case the rear edge of the plate-bundle may be fixed in the extrusion head.

According to another embodiment of the apparatus according to the invention the pressing bars for the steel plate or steel plate bundle are operated by pistons of a hydraulic unit.

According to a further possible emobidment only one of the lips of the extrusion opening is made of a deformable plate and the other is made as a one-piece profile element.

The supports applied for varying the shape of the opening formed by the steel plate or steel plate bundle may be controlled and adjusted by any method known per se.

Figure 2:
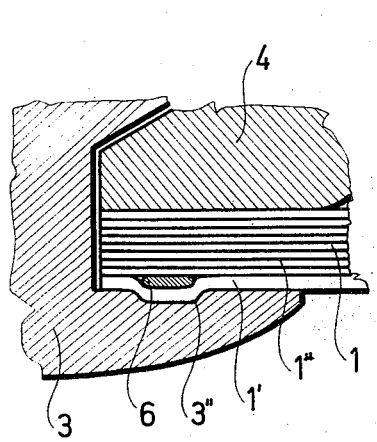
Figure 3:
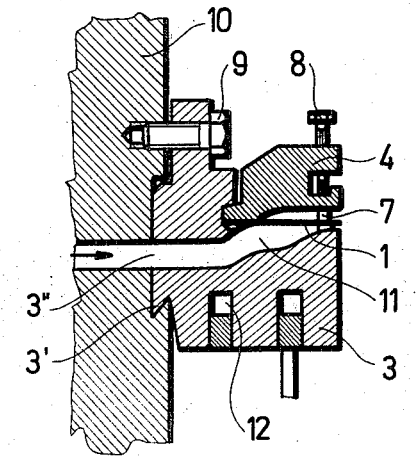
Figure 4:
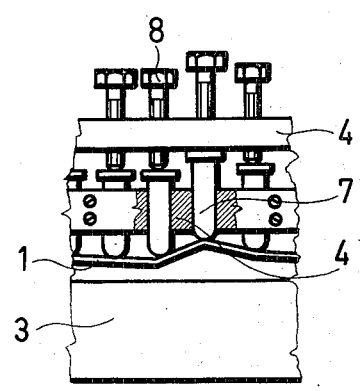

Some embodiments of the invention are described by way of example in the following in connection with the drawings. In the drawings FIG. 1 is a diagrammatic front view of the continuously variable discharge opening, FIG. 2 is a sectional view of a detail on a larger scale relating to one possible embodiment of fixing the steel plate bundle, FIG. 3 is the sectional view of one embodiment according to the invention, FIG. 4 is a schematic partial view of the same embodiment representing the steel bundle regulating the opening and the members for pressing the plates as well.

Figure 5:
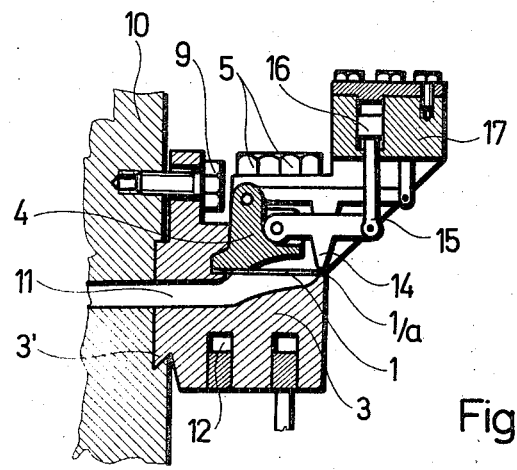
Figure 6:
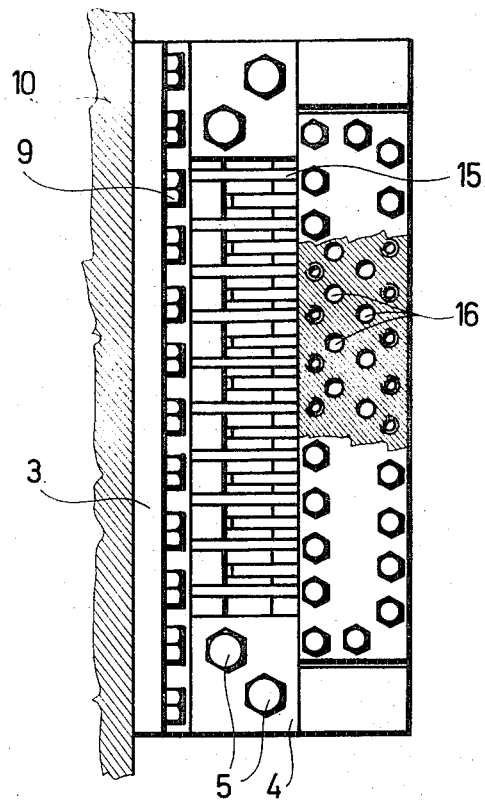

FIG. 5 is a sectional view showing a hydraulic variation of regulating the opening, and FIG. 6 is a partial plan and sectional view of the embodiment according to FIG. 5.

The principle of the apparatus according to the invention is shown in FIG. 1. It is represented on the said Figure that the variable part of the discharge opening $1a$ is formed by a steel plate bundle 1 which is inserted along its edges between the lower part 3 and upper part 4 of the extrusion head. The said two parts are secured by screws 5. This gripping enables a movement of the steel plate bundle 1 in the direction A–A', which occurs while forming the discharge opening $1a$ for an extrudate having a determined profile.

It is necessary to fix the steel plate bundle 1 preferably along its inner or upstream edge lying perpendicular to the direction of the extrusion, for counterbalancing the forces acting in the direction of the extrusion on the lowermost steel plate 1' deriving from the friction of the mixture to be extruded and tending to shift forward the steel plate. Fixing may be done for example in the manner shown in FIG. 2 according to which the lowermost steel plate 1' is pressed into a groove 3" formed in the lower part 3 of the head, by inserting between the lowermost steel plate 1' and the next one 1" disposed thereon a wedge or a profile piece 6 having the same cross-section as the aforesaid grooves.

According to FIGS. 1 and 4 the profile of the discharge opening $1a$ is formed by the high pressure of the extrudate F flowing out in a manner such that the steel plate bundle 1 is pressed against the supporting profile pieces 7 and adjusting screws 8 respectively which follow the discharge profile.

FIG. 3 shows schematically an embodiment of the apparatus according to the invention. According to the said Figure the head is mounted on a housing 10 by fastening screws 9 after being inserted in dovetail grooves 3'. The extrudate F passing through the channel 11 presses the forward edge of the steel plate bundle 1 to the profile pieces 7 by the pressure created in the head forming thereby the discharge opening $1a$ having the desired cross section according to the adjustment of the profile pieces. The profile pieces 7 may be lifted and lowered independently from each other. It is shown further in FIG. 3 that heating for example steam heating may be applied through a duct 12. On the other hand by this duct the required temperature of the head may be secured by cooling, for example water cooling during the extrusion operation. Heating and cooling may be of course realised in some other way if desired.

Another variant of the apparatus according to the invention is the embodiment having a hydraulic automatic regulating system which is shown in FIGS. 5 and 6. The fastening of the head on the housing 10 is realised in the manner as described already in connection with the previous embodiment. The extrudate passes through the channel 11 and presses the steel plate bundle 1 to the pressing bars 14. The said pressing bars are connected through pressure arms 15 to pistons 16 of a hydraulic unit 17. The pistons are actuated by a usual working fluid. Shaping, that is to say, narrowing and widening some parts, of the discharge opening 1a is attained by the use of the hydraulically operated pressing bars 14. Depending on the field of application the pressing bars 14 may be disposed at a different distance from each other, thus for example in the rubber industry the extrusion of tyre treads is carried out by pressing bars disposed at a distance of 10 to 25 mm from each other, while extrusion for obtaining finer profile forms may be carried out by using pressure bars arranged at a smaller distance from each other.

What we claim is:

1. An adjustable extrusion die comprising an extrusion head having an extrusion cavity in said head, two opposed lips defining between them an extrusion orifice through which material from said cavity is extruded and shaped, at least one of said lips comprising at least one resilient metal strip that extends transversely of the direction of extrusion, means securing to the die the edge of said strip which is upstream with respect to the direction of extrusion, the edge of said strip which is downstream with respect to the direction of extrusion being free to move transversely of said direction, and a row of support elements extending along and contacting said downstream edge of said strip on the side of said strip opposite the side past which material is extruded, and means adjustably mounting said support elements for movement in a direction perpendicular to the length of the strip and perpendicular to said direction of extrusion thereby to alter the contour of said orifice.

2. An extrusion die as claimed in claim 1, said at least one lip being comprised by a bundle of resilient metal strips.

3. An extrusion die as claimed in claim 1, said strip being steel.

4. An extrusion die as claimed in claim 1, said adjustable mounting means comprising pivotally mounted members and hydraulic means for pivoting said members.

5. An extrusion die as claimed in claim 1, the other said lip comprising a rigid profile piece.

* * * * *